G. B. WILLCOX.
LIQUID MEASURING MACHINE.
APPLICATION FILED MAR. 14, 1917.
1,402,820.
Patented Jan. 10, 1922.
3 SHEETS—SHEET 3.
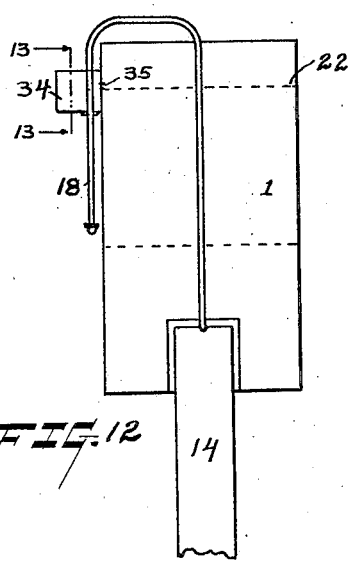
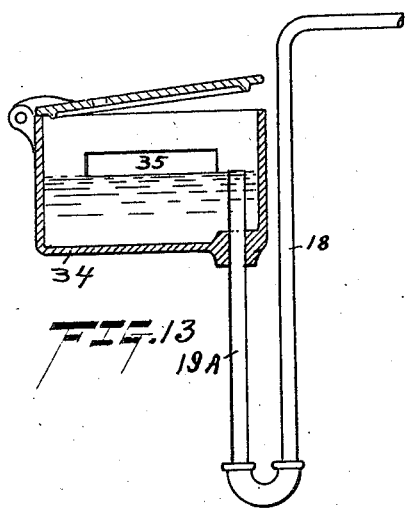
INVENTOR
Geo. B. Willcox

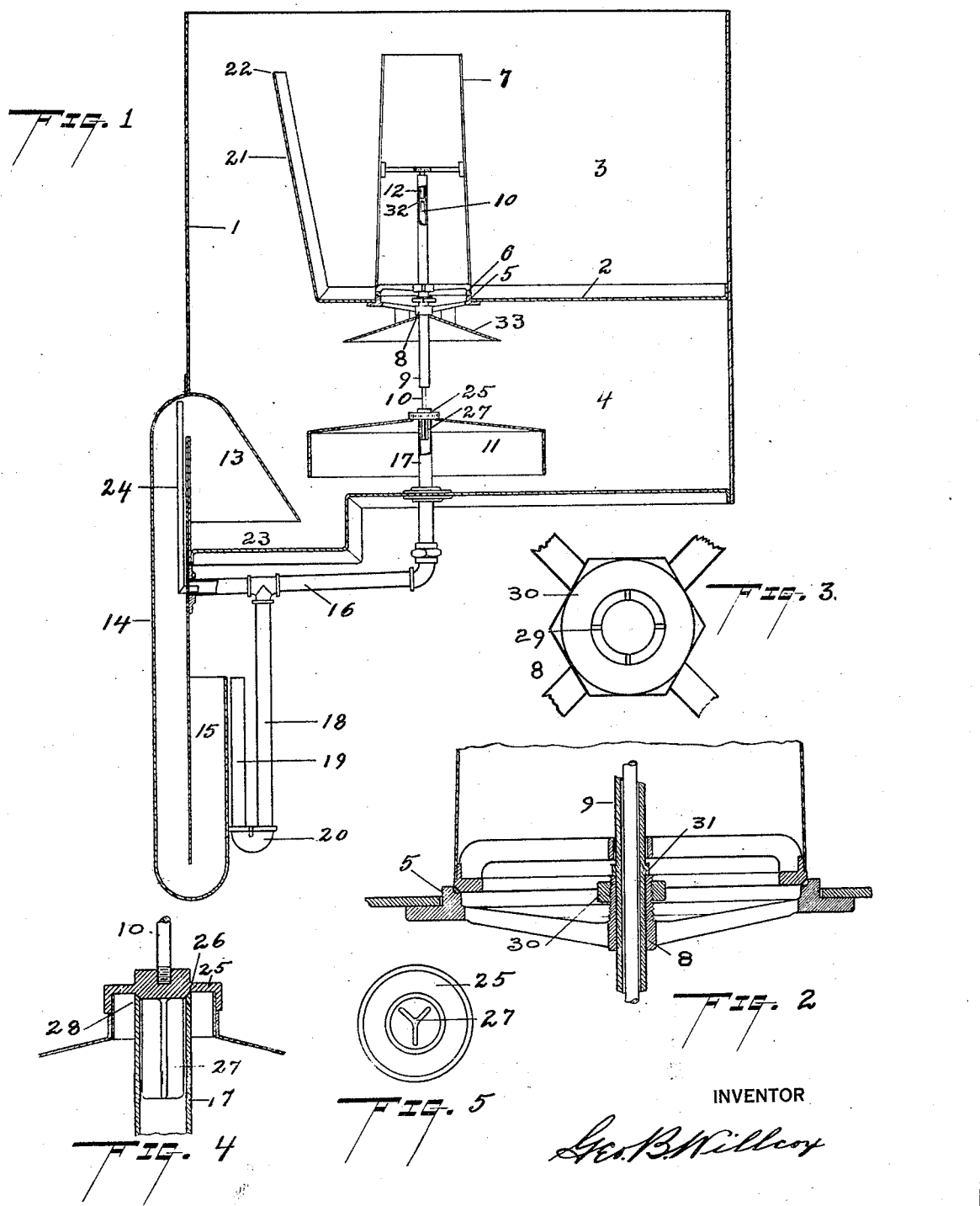

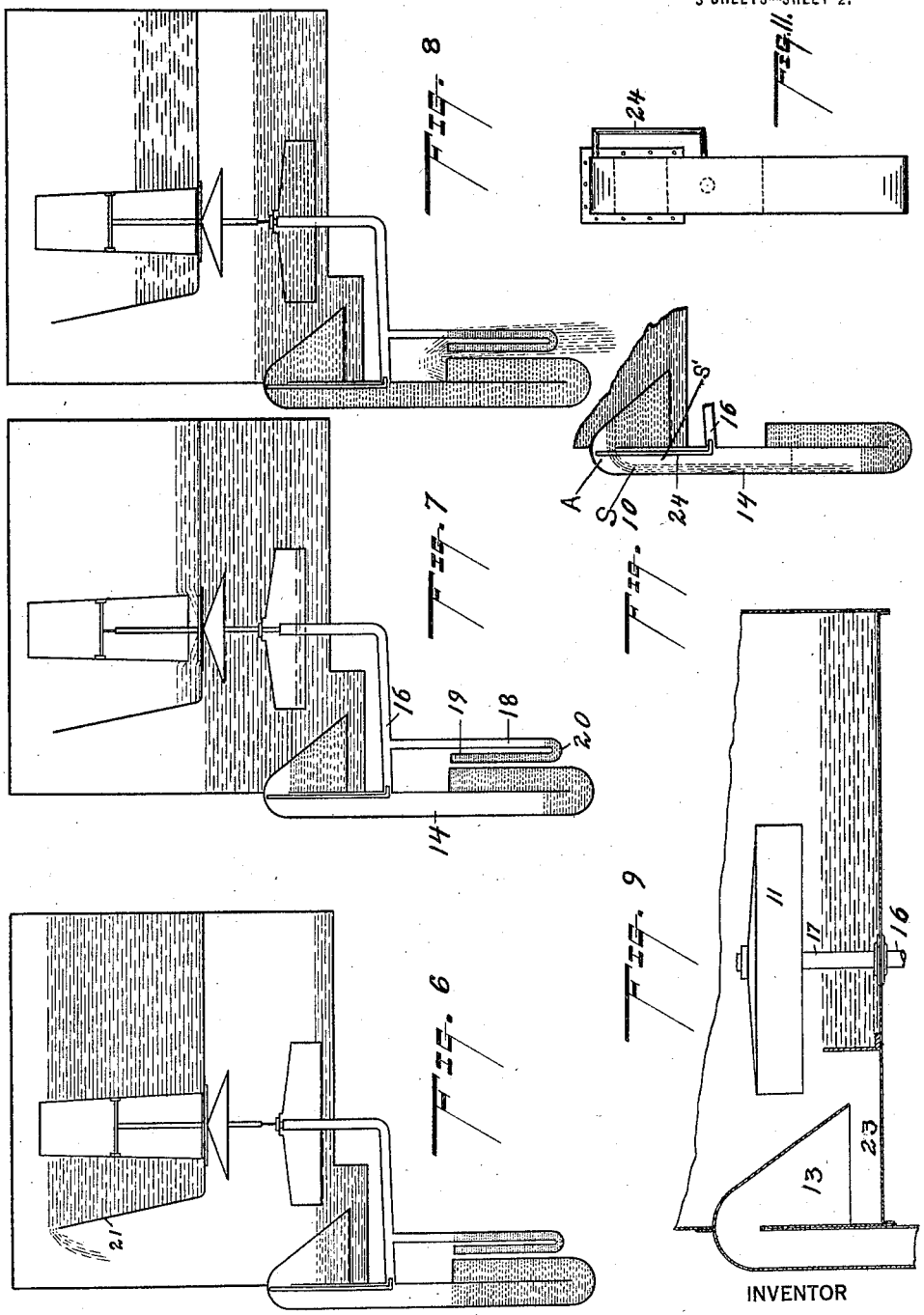

UNITED STATES PATENT OFFICE.

GEORGE B. WILLCOX, OF SAGINAW, MICHIGAN.

LIQUID-MEASURING MACHINE.

1,402,820.  Specification of Letters Patent.  Patented Jan. 10, 1922.

Application filed March 14, 1917. Serial No. 154,778.

*To all whom it may concern:*

Be it known that I, GEORGE B. WILLCOX, a citizen of the United States, residing at Saginaw, in the county of Saginaw and State of Michigan, have invented certain new and useful Improvements in Liquid-Measuring Machines; and I do hereby declare the following to be a full, clear, and exact description of the invention, such as will enable others skilled in the art to which it appertains to make and use the same.

This invention relates to liquid measuring machines and pertains more particularly to that class of liquid measuring devices comprising a receiving compartment for the liquid to be measured, a measuring compartment, and air-controlled devices adapted to automatically release the measured charge when the predetermined unit charge has accumulated in the measuring compartment.

My present improvement relates more particularly to the construction and arrangement of the parts of a measuring device whereby the objects of my invention are attained.

These objects are, first, to increase the hourly capacity of the machine in proportion to the space occupied by the machine; second, to increase the accuracy of measurement at slow rates and fast rates; third, to so arrange the parts of the machine that all of its functions may be observed while the machine is in operation, and to enable the working parts to be removed and replaced without the necessity of unfastening gaskets or packed joints.

A further object is to provide an improved arrangement and construction of the discharge pipe and of the trip pipe.

With the above and certain other objects in view, which will appear later in the specification, my invention comprises the devices described and claimed and the equivalents thereof.

In the drawings, Fig. 1 is a sectional elevation of the machine, broken away in part.

Fig. 2 is an enlarged section through the stand pipe seat and the lower part of the stand pipe.

Fig. 3 is an enlarged top plan view of the lock nut on the stand pipe seat.

Fig. 4 is an enlarged transverse section of the bell float cap.

Fig. 5 is a bottom view of the bell float cap.

Figs. 6, 7 and 8 are diagrammatic sectional views showing the successive steps in the operation of the machine.

Fig. 9 is a vertical section through the lower part of the measuring compartment, showing a modified bottom construction.

Fig. 10 is a diagrammatic section through the discharge pipe, showing the manner in which the water flows through the pipe at the commencement of discharge.

Fig. 11 is a front elevation of a discharge pipe, showing a modified form of air equalizing tube.

Fig. 12 is a diagrammatic end elevation of a machine with a modified arrangement of the trip pipe.

Fig. 13 is an enlarged transverse section on the line 13—13 of Fig. 12.

As is clearly shown in the drawing, the machine consists in a shell or body 1 divided, by means of the horizontal dividing bottom 2, into an upper receiving compartment 3 and a lower or measuring compartment 4. The receiving compartment contains a vertically movable stand pipe, and the measuring compartment contains a vertically movable bell float adapted to raise and lower the stand pipe. A liquid discharge pipe and an air release or trip pipe communicate with the measuring compartment. The receiving compartment may be open, as illustrated, or covered. The liquid to be measured may be supplied to the upper compartment through any suitable inlet pipe, not shown. The dividing bottom is formed with an opening, in which is a seat ring 5, to receive the face 6 of the vertically movable stand pipe 7. The hub 8 of the seat 5 carries a guide tube 9, the lower end of which projects into the measuring compartment, and the upper end projects into the receiving compartment. Within this guide tube is slidingly received the stem 10 of a vertically movable bell float 11. The pin 12 of the stand pipe 7 is also received in the upper end of the guide tube 9, so that the bell float when it lifts, will also lift the stand pipe.

The discharge pipe is preferably of rectangular cross section, in order that the U-bend at its upper end may afford a large area for the flow, permitting the measured charge to pass through in the shortest time, and yet have small vertical height of flow section at the U-bend, to reduce the liability of forming an air pocket therein, as will be later set forth. The discharge pipe comprises a hood 13, which projects into the lower compartment, a downwardly extending leg 14 and an upwardly extending leg 15, the lower ends of the legs 14 and 15 forming a U-pipe or return bend.

An air tube 16 connects the leg 14 of the discharge pipe with the interior of the bell float 11. The upwardly projecting end 17 of the air tube serves as a support for the float and also as a stop to limit its downward movement.

A trip pipe is connected to the air tube 16. This trip pipe comprises a down leg 18, and an upwardly extending leg 19 connected by a U-bend 20.

The receiving compartment 3 is preferably provided with an end or partition 21 spaced apart from the shell 1 a sufficient distance to permit the bell float 11 to be readily removed through the space so provided. The upper edge 22 of the partition is preferably below the top of the shell 1, to permit the liquid to spill over the partition into the lower compartment during the first part of the operation of the machine.

The mode of operation of the machine is indicated diagrammatically in Figs. 6, 7 and 8.

In Fig. 6 is shown the upper compartment filled with liquid from any suitable source and spilling over the partition 21. Sufficient liquid has been spilled into the measuring compartment to seal the lower edge of the bell float and the lower edge of the discharge pipe hood, thereby entrapping the body of air which is contained in the bell float, the upper part of the discharge pipe, and the air tube 16 connecting them. When sufficient liquid has spilled over to lift the bell float, it rises, lifting the stand pipe and allowing the liquid from the upper compartment to flow beneath the bottom edge of the stand pipe through the stand pipe seat, filling the lower compartment, as shown in Fig. 7. The entrapped air in the bell float, discharge pipe and air tube 16 is thereby compressed to a degree that exactly balances the hydrostatic pressure of the accumulated liquid in the measuring and receiving compartments and consequently the difference in level in the two legs 18 and 19 of the manometer or trip pipe exactly equals the hydrostatic pressure of the liquid in the machine.

When the level in the leg 18 of the trip pipe subsides to the U-bend 20, the column of liquid in the leg 19 is suddenly overbalanced and blown out, thereby releasing the air from the bell float and from the discharge pipe. The bell float, discharge pipe and air tube 16 immediately fill with liquid and the bell float drops, seating the stand pipe and shutting off the upper compartment. The sudden release of the entrapped body of air from the upper part of the discharge pipe allows the discharge pipe to fill with liquid. The liquid in the measuring compartment flows out by gravity at a very rapid rate, on account of the low head of the discharge pipe hood, as shown in Fig. 7, until the level in the measuring compartment has subsided to about the level of the upper end of the discharge pipe hood, as in Fig. 8. A solid stream having been established down through the discharge pipe by the gravity flow of the escaping liquid, the discharge pipe is required to act as a syphon only during the last few seconds of the operation of emptying the lower compartment, as will be seen by comparing the liquid levels in the measuring compartments of Figs. 8 and 6, the latter representing the level after the liquid of Fig. 8 has syphoned out.

In handling hot water or other liquids, it is desirable to reduce the syphoning action to a minimum, and to so arrange the discharge pipe that the greater part of the charge will escape by gravity flow. The bottom part of the shell 1 may be formed with a well, 23 Fig. 9, whereby the lower end of the hood 13 may remain submerged until the measuring compartment is nearly empty.

In the preferred arrangement of trip pipe shown in Fig. 1, the leg 19 is arranged close to the delivery leg 15 of the discharge pipe, so that the flow from the discharge pipe will fill and seal the trip ready for the next charge.

It has been found in practice that when the discharge pipe is suddenly flooded with liquid from the measuring compartment by the release of the entrapped air, as above described, the stream from the hood 13 into the leg 14 does not fill the top of the hood completely. An air pocket, as A, Fig. 10, is sometimes formed above the surface of the incoming stream S. This pocket of air, remaining in the top of the discharge hood cuts off a part of the available area for the escape of liquid and thereby throttles the outflowing stream, resulting in a slower operation of the machine and reducing its hourly capacity.

Referring to Fig. 10, which illustrates diagrammatically the manner in which the liquid commences to flow through the discharge pipe when the entrapped air has been suddenly released by the blowing out of the trip pipe, column 19, 24 is a pressure equalizing tube or equivalent passageway that connects the upper part of the discharge pipe hood, or that part of the hood which is above the surface of the incoming stream S, with the space S' in front of and below the stream, which latter space is in communication with the air tube 16.

With equalizing tube 24 in place, the trip column 19 blows, releasing the entrapped compressed air from discharge pipe leg 14, the formation of an air pocket A is prevented, because the air above the incoming stream S escapes through the tube 24, tube 16 and trip pipe 19. Consequently the discharge pipe "catches solid" at once, and the discharging water, instead of falling down along the back wall of the discharge pipe leg 14, as indicated in Fig. 10, fills the entire cross section of the hood and of leg 14, thereby practically doubling the speed of discharge of the machine and greatly increasing its hourly measuring capacity.

Tube 24 may be entirely concealed within the discharge pipe, as shown in Fig. 10, or it may be outside the discharge pipe, as shown in Fig. 11. It may be an independent tube, or if desired, may be formed integral with the discharge pipe.

The bell float 11 is preferably provided with a cap 25, Figs. 4 and 5, formed with a beveled face 26, and is also preferably provided with a downwardly projecting guide member 27, which is preferably slidingly received within the upwardly projecting end 17 of the air tube 16, whereby the bell float is guided and kept in alignment during its vertical movement. The upper end of tube 17 is also provided with a beveled seat 28 to receive the beveled face 26 of the float top cap.

The tube 17 and its seat limits the downward movement of the bell float and keeps the float 11 and its stem 10 in proper alignment with the seat 5 and stand pipe 7. Cap 25 closes the top of the tube 17 when the bell float drops, and prevents air being drawn into the tube 16 after the discharging liquid has receded below the float rim, and before it has receded to the bottom of the discharge pipe hood 13, thereby preventing premature breaking of the suction in the discharge pipe. The lower end of the guide tube 9 serves as a stop to limit the upward movement of the bell float 11.

The guide tube 9 is preferably clamped to the hub 8 of the seat ring 5 in the manner shown in Figs. 2 and 3. The hub 8 is exteriorly threaded and is formed with transverse slots 29. A nut 30 is threaded on the split hub and when the nut is screwed down tight the hub firmly clasps the tube 9 without liability of marring it.

A collar 31 may be provided on the tube to engage the top of the hub 8 and acts as a stop by which to locate tube 9 to properly limit the vertical movement of the float 11. Between the upper end of float stem 10 and the lower end of the stand pipe pin 12 a clearance space 32 is provided so that the stand pipe 7 may freely adjust itself to the the seat 5 independent of the float stem when the float is down.

To prevent the liquid from the upper compartment dropping directly upon the float, I prefer to provide a suitable removable baffle or umbrella 33, which is preferably carried by the spider of the stand pipe seat 5, as shown in Fig. 1.

The operation of the machine is as follows:

Liquid first enters the upper compartment, filling it as shown in Fig. 6, and spilling over into the lower compartment until the float and stand pipe hood are sealed. The float then lifts, raising the stand pipe, and the upper compartment thereupon rapidly empties into the lower. The increasing air pressure in the float, air tube 16 and discharge pipe leg 14—see Fig. 7—forces down the seal liquid in the legs 14 and 18 of the discharge pipe and trip pipe respectively, the displacement being made up by air automatically carried over from bell float 11. The decrease in the total volume of the entrapped air, caused by compression due to the increasing hydrostatic pressure, is likewise made up by the air entrapped under the float.

When the liquid level in tube 18 reaches the return bend, the charge of liquid in the machine is exactly counterbalanced, through the medium of the entrapped air cushion, by the column of liquid in up-leg 19 of the trip pipe. This column of liquid becoming overbalanced by the liquid in the machine, is then suddenly blown out, causing the float to quickly fill with liquid and to drop almost instantly. The discharge pipe leg 14 likewise fills with liquid, and the delivery of the unit charge takes place, as shown in Fig. 8, while the upper compartment is again being filled. The outflow is gravity discharge until the level reaches the top of the hood 13 and from there to the bottom edge of the hood is by syphoning. The syphoning action is for only about three seconds and does not break even when boiling liquids are being measured.

The level of the liquid in the lower compartment recedes until it reaches the bottom edge of the discharge pipe hood, thereupon breaking the syphon, but leaving the lower U-bend of the discharge pipe filled with liquid, as shown in Fig. 6.

In the arrangement shown in Figs. 1 and 8 the refilling of the trip pipe is accomplished by the liquid escaping from the discharge pipe, but in the arrangement shown in Fig. 12, the trip pipe is connected to the upper end of the discharge pipe hood instead of to the air tube 16 as in the arrangement previously described. The trip pipe can thus be located above the machine instead of below.

To refill the trip pipe 19$^A$—Fig. 13—I prefer to enclose the upper end of the trip pipe in a suitable box 34, which contains a liquid to be used in the trip pipe. If it is desired to employ in the trip pipe the same liquid that is being measured I prefer to connect the trip pipe box 34 with the shell 1 by means of the passageway 35, which is located at the level of the spill-over 22, so that at each operation of the machine the box 34 will be ressupplied with liquid and at each emptying of the upper compartment the liquid in the box will subside to the level of the lower edge of the passage 35, thus securing a standard height for the trip column in pipe 19ᴬ, and avoiding any liability of reduction in height of the trip column which might be caused by evaporation or leakage from the box 34.

If, however, a different liquid is desired to be employed in the trip pipe from that which is being measured, the opening 35 may be dispensed with, and the box and trip pipe may be filled with the desired liquid. In this case the trip pipe box may be located at any reasonable distance from the machine so that the liquid in the trip pipe and box may not be affected by changes of temperature of the liquid being measured, thus making it possible to calibrate the machine by weight, independent of temperature corrections.

A machine built in accordance with the foregoing description has the following important advantages:

The stand pipe may be removed and replaced without removing any fastenings; the bell float may be taken out by merely unscrewing the float stem and lifting the float out through the opening between the partition 21 and the shell 1; the trip pipe is accessible and can be quickly removed and replaced; and all of the air-containing parts of the discharge pipe, the trip pipe and the tube 16, can be inspected and tested without dismantling the machine. It is also possible to observe the functions of the machine without taking it apart. The inflow of liquid from the supply to the upper compartment is visible, as is also the spill-over into the lower compartment when the upper compartment is filled; and the lifting of the bell float and stand pipe and the condition of the stand pipe seat are visible. The blowing of the trip pipe and the dropping of the bell float and seating of the stand pipe, as well as the condition of the stream from the discharge pipe, and the "cleaning out" of the weighed charge in the bottom of the machine, are also easily inspected without taking the machine apart.

Dirt or scale can likewise be scraped and washed out of the machine without dismantling it.

The accessibility of the parts and the facility with which they can be inspected, as well as the simplicity of construction, are important features in machines of this class, which are extensively used for such service as measurement of boiler feed water, where the machine is installed in a boiler room and can usually receive in practice only a limited amount of care and attention.

Any suitable counting or indicating device may be employed to count the successive charges, but since such devices do not form a feature of the present application, they are not illustrated herein.

The unit charges of the machine can be calibrated in pounds by weighing the charges as delivered from the machine to a tank located on platform scales, and when once so calibrated, the machine can be depended upon to deliver charges of uniform weight and with a very slight degree of inaccuracy both under varying conditions of temperature and under widely varying rates of flow.

Having thus described my invention, what I claim and desire to secure by Letters Patent is:

1. In a liquid measuring machine of the class described including a shell divided into an upper and a lower compartment by a dividing bottom having an upwardly extending partition spaced apart from the shell of said machine, a bell float removably mounted in the lower compartment, a discharge pipe having a hood at its upper end and a trap pipe at its lower end, the inlet of said hood projecting into said lower compartment near its bottom, an air pipe connecting said float and discharge pipe, a trip pipe communicating with said air pipe, and an air conduit connecting the upper part of the hood of said discharge pipe with said trip pipe.

2. In a liquid measuring machine of the class described including a shell divided into an upper and a lower compartment by a dividing bottom having an upwardly extending partition spaced apart from the shell of said machine, a bell float removably mounted in the lower compartment, a discharge pipe having a hood at its upper end and a trap pipe at its lower end, the inlet of said hood projecting into said lower compartment near its bottom, an air pipe connecting said float and discharge pipe and a trip pipe communicating with said air pipe.

3. In a liquid measuring machine of the class described including a measuring compartment and a discharge pipe connected thereto, a vertically movable bell float in said measuring compartment, an air tube, the upper end of said tube projecting into said bell float substantially to the top thereof, the other end of said tube communicating with the discharge pipe, and a trip pipe communicating with said discharge pipe and bell float, for the purposes set forth.

4. In a liquid measuring machine having a measuring compartment and including a vertically movable bell float in said measuring compartment, an air release tube having its end projecting upwardly into said float, a cap in the top of said float, a guide member on said cap adapted to slidingly engage the upper end of said tube, the lower face of said cap adapted to engage the upper end of said tube to support the float when the float is at the bottom of its travel.

5. In a liquid measuring machine including a discharge pipe comprising an in-take hood and a downwardly extending leg, an air conduit connecting the upper part of said hood with that part of the downwardly extending leg below the hood.

6. In a liquid measuring machine, a discharge pipe having an in-take hood projecting into the measuring compartment and a downwardly extending leg having a liquid seal at the lower end thereof and an air conduit connecting the upper part of said hood with that part of the downwardly extending leg below the hood.

7. In a liquid measuring device including a measuring compartment, a bell float vertically movable in said compartment, a discharge pipe having a hood at its upper end and a liquid seal at its lower end, said discharge pipe located at one side of said compartment, a trip pipe, an air tube connecting said trip pipe and said bell float, and an air tube connecting said trip pipe and said discharge pipe.

8. In a liquid measuring device including a measuring compartment, a bell float, a discharge pipe having a hood projecting into said compartment near one side thereof, and a downwardly extending leg having a liquid seal at the lower end thereof, a trip pipe and air tubes connecting said trip pipe with the air spaces of the bell float and discharge pipe respectively, and a tube connecting the upper part of the discharge pipe hood with that part of the downwardly extending leg below the hood.

9. In a liquid measuring machine including a receiving compartment, a measuring compartment and a discharge pipe, a removable bell float in said measuring compartment, an upwardly extending end of said receiving compartment spaced apart from the shell of the machine, and forming a passageway for the removal of said bell float.

10. In a liquid measuring machine of the class described, a discharge pipe having a hood at its upper end and a liquid seal at its lower end, a bell float in said machine, an air conduit connecting said bell float and discharge pipe, a trip pipe connected to said conduit, said trip pipe located in proximity to the nozzle of said discharge pipe and adapted to be filled by liquid discharged therefrom.

In testimony whereof, I affix my signature in presence of two witnesses.

GEORGE B. WILLCOX.

Witnesses:
NELLIE M. ANGUS,
ROY WALLIS.